E. ARNOLD.
RINK.
APPLICATION FILED JUNE 20, 1913.
1,094,411.
Patented Apr. 28, 1914.
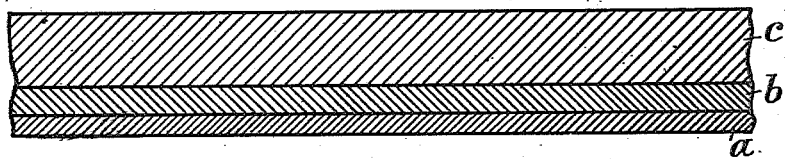

UNITED STATES PATENT OFFICE.

EDUARD ARNOLD, OF BERLIN, GERMANY.

RINK.

1,094,411. Specification of Letters Patent. Patented Apr. 28, 1914.

Application filed June 20, 1913. Serial No. 774,944.

*To all whom it may concern:*

Be it known that I, EDUARD ARNOLD, a subject of the King of Prussia, residing at Berlin Germany, have invented a new and useful Improvement in Rinks, of which the following is a specification.

This invention relates to rinks or similar sliding surfaces or floors, both portable and fixed.

Rinks or similar sliding surfaces of floors—which will hereinafter be termed rinks—of the kind to which the present invention relates, comprise an upper layer or surface of crystalline salts below which is arranged a layer of porous material and means below the latter for keeping it moist.

The present invention aims at the provision of a rink having means capable of maintaining the right degree of moisture in the superficial or sliding layer under both the opposite conditions of drought and of excess of dampness. This I attain by means of a hygroscopic substance not mixed in with the crystalline salt or otherwise integrally incorporated with the upper layer or surface but separated therefrom by an absorbent layer or one capable of exerting a suction action.

The accompanying drawing represents a cross section of part of a rink-floor embodying my invention.

The rink or sliding surface illustrated, comprises three layers, namely, a layer $a$ consisting of water-attracting substances such for instance as magnesium chlorid, a second layer $b$ consisting of a mass capable of taking up the water, such for instance as paper material, porous minerals, and the like, and a third layer $c$ composed of crystalline salts and constituting the sliding or running surface proper. When the air is too wet the layer $b$ sucks up the excessive moisture from the crystalline layer $c$ and gives up this moisture to a certain degree to the layer $a$ consisting of hygroscopic or water-attracting materials. If, however, the external air is too dry, the layer $b$ on the other hand sucks up water from the layer $a$ and gives this water to the running or sliding layer $c$ in order to keep constant the quality of surface favorable to sliding.

In order to maintain the running and sliding surface proper taut in all cases, and at the same time to increase its smoothness, the crystalline masses forming same, such as carbonates and sulfates of sodium in fused condition, may have talc added thereto so as to fill out any crevices that may occur in said surface. This use of talc is not claimed as new but is mentioned as a means of improving the surface in cases where it is desirable.

I claim:

A rink comprising a top layer of crystalline salts, a lower absorbent layer, and a hygroscopic bottom layer.

EDUARD ARNOLD.

Witnesses:
 WOLDEMAR HAUPT,
 HENRY HASPER.